US012573680B2

(12) United States Patent
Utsumi et al.

(10) Patent No.: US 12,573,680 B2
(45) Date of Patent: Mar. 10, 2026

(54) BATTERY PACK CASE HAVING COOLING AIR FLOW PATH

(71) Applicant: TOYOTA JIDOSHA KABUSHIKI KAISHA, Toyota (JP)

(72) Inventors: Shintaro Utsumi, Susono (JP); Isao Takahashi, Toyota (JP); Kenichi Kohashi, Sunto-gun (JP); Tomohiro Segawa, Nisshin (JP); Shunsuke Takahashi, Okazaki (JP); Koichi Ueno, Miyoshi (JP); Shunsuke Nagata, Nagakute (JP); Tatsuhiko Adachi, Toyota (JP); Hitoshi Nada, Kasugai (JP); Hiroki Ohtsubo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 592 days.

(21) Appl. No.: 18/146,711

(22) Filed: Dec. 27, 2022

(65) Prior Publication Data

US 2023/0261275 A1      Aug. 17, 2023

(30) Foreign Application Priority Data

Feb. 14, 2022      (JP) ................................. 2022-020798

(51) Int. Cl.
| | |
|---|---|
| *H01M 10/61* | (2014.01) |
| *H01M 10/613* | (2014.01) |
| (Continued) | |

(52) U.S. Cl.
CPC ..... *H01M 10/613* (2015.04); *H01M 10/6563* (2015.04); *H01M 50/204* (2021.01);
(Continued)

(58) Field of Classification Search
CPC ............. H01M 10/613; H01M 10/615; H01M 10/617; H01M 10/6563; H01M 10/6562;
(Continued)

(56) References Cited

U.S. PATENT DOCUMENTS

| | | |
|---|---|---|
| 2020/0259139 A1 | 8/2020 | Nomizo |
| 2022/0216552 A1 | 7/2022 | Nomizo |

FOREIGN PATENT DOCUMENTS

| | | | | |
|---|---|---|---|---|
| JP | 2009266690 A | * 11/2009 | ............. | H01M 2/04 |
| JP | 2020-129474 A | 8/2020 | | |

OTHER PUBLICATIONS (Abstract of JP-2009266690) Mita et al., "Method of Manufacturing Power Storage Device and Metal Battery Case", Nov. 12, 2009.*

* cited by examiner

*Primary Examiner* — Raymond Alejandro
(74) *Attorney, Agent, or Firm* — Oliff PLC

(57) ABSTRACT
A battery pack case includes a metal housing assembly accommodating, from one side in a second direction, battery cells stacked in a first direction perpendicularly intersecting the second direction, the assembly supporting a restoring force of the battery cells; and a resin flow path forming member, integral with the assembly and disposed at another side of the battery cells, and configuring a cooling air flow path. The assembly includes a first component including a pair of first side wall parts support the battery cells in a third direction perpendicularly intersecting the first and second directions, and a support wall part supporting the battery cells from the other side in the second direction; and a pair of second components, including a second side wall part supporting the battery cells in the first direction, and a pair of third side wall parts provided continuously with the second side wall part.

4 Claims, 10 Drawing Sheets

(51) Int. Cl.
    *H01M 10/6563* (2014.01)
    *H01M 50/204* (2021.01)
    *H01M 50/224* (2021.01)
    *H01M 50/262* (2021.01)

(52) U.S. Cl.
    CPC ....... *H01M 50/224* (2021.01); *H01M 50/262*
        (2021.01); *H01M 2220/20* (2013.01)

(58) Field of Classification Search
    CPC ............. H01M 50/262; H01M 50/264; H01M
        50/224; H01M 50/227; H01M 50/229;
        H01M 50/204; H01M 2220/20
    See application file for complete search history.

FIG.4

BATTERY PACK CASE HAVING COOLING AIR FLOW PATH

CROSS-REFERENCE TO RELATED APPLICATION

This application is based on and claims priority under 35 USC 119 from Japanese Patent Application No. 2022-020798 filed on Feb. 14, 2022, the disclosure of which is incorporated by reference herein.

BACKGROUND

Technical Field

The present disclosure relates to a battery pack case.

Related Art

Japanese Patent Application Laid-Open No. 2020-129474 discloses an invention relating to a pack case. In this pack case, the restoring force of a battery stack configured by stacking plural battery cells is supported by a side wall part configured by a sandwich panel structure.

Here, since the battery cells generate heat during charging and discharging, it is preferable that the pack case be provided with a flow path for cooling air to cool the battery cells.

However, since a cooling air flow path for cooling the battery cells is not provided in the conventional technique described above, there is room for improvement in terms of cooling the battery cells. While, by configuring the pack case as a cast article, the shape of the pack case can ensure a flow path for cooling air, such a configuration increases the weight of the pack case.

SUMMARY

In consideration of the foregoing circumstances, an object of the present disclosure is to obtain a battery pack case capable of ensuring a flow path for cooling air for a battery cell and suppressing any increase in weight while maintaining a stable state of the battery cell.

A battery pack case according to a first aspect of the present disclosure includes: a battery cell housing part, the battery cell housing part being made of metal, the battery cell housing part being configured to accommodate, from one side in a second direction, a battery cell in a state in which the plural battery cells are stacked in a first direction perpendicularly intersecting the second direction and are compressed in the first direction, and the battery cell housing part being configured to support a restoring force of the battery cell; and a flow path forming part, the flow path forming part being made of resin, the flow path forming part being provided integrally with the battery cell housing part, the flow path forming part being disposed at another side, in the second direction, of the battery cell, and the flow path forming part configuring a part of a cooling air flow path part through which battery cell cooling air flows.

In the first aspect of the present disclosure, the battery cell housing part is made of metal, and the battery cell housing part accommodates, from one side in a second direction, a battery cell in a state in which plural of the battery cells are stacked in a first direction perpendicularly intersecting the second direction and are compressed in the first direction. Further, the restoring force of the battery cell is supported by the battery cell housing part.

Since the battery cells generate heat during charging and discharging, it is preferable to provide a flow path for cooling air to cool the battery cells. However, if the battery cell housing part is made of metal and the entire cooling air flow path is provided in the battery cell housing part, the configuration of the battery cell housing part becomes complex, and the battery cell housing part needs to be configured as a cast product. However, such a configuration may increase the weight of the battery pack case.

In the present disclosure, a flow path forming part made of resin is provided integrally with the battery cell housing part, and the flow path forming part is disposed at another side, in the second direction, of the battery cell, and configures a part of the cooling air flow path part through which the cooling air for the battery cell flows.

Accordingly, in the present disclosure, portions of the cooling air flow path part that are complex in shape are formed by the flow path forming part made of resin, whereby the configuration of the battery cell housing part can be kept from becoming complex while securing a flow path for cooling air to cool the battery cells.

A battery pack case according to a second aspect of the present disclosure is the first aspect, in which the battery cell housing part includes: a first component, including: a pair of first side wall parts that extend in the first direction and that are configured to support the battery cell in a third direction perpendicularly intersecting the first direction and the second direction; and a support wall part that supports the battery cell from the another side in the second direction; and a pair of second components, including: a second side wall part configured to support the battery cell in the first direction; and a pair of third side wall parts that are provided continuously with the second side wall part at one side and another side, in the third direction, of the second side wall part, and that are joined to the respective first side wall parts.

In the second aspect of the present disclosure, the battery cell housing part includes a first side wall part extending in the first direction and capable of supporting the battery cell in a third direction, a support wall part that supports the battery cell from the other side in the second direction, and a second side wall part that is capable of supporting the battery cell in the first direction.

Here, in the battery cell housing part configured as described above, since the restoring force of the battery cell mainly acts on the second side wall part, it is preferable that the tensile strength and rigidity of the second side wall part with respect to the restoring force can be secured.

On the other hand, since the restoring force of the battery cell does not act directly on the first side wall part and the support wall part, actively ensuring the tensile strength and rigidity of the first side wall part and the support wall part with respect to the restoring force may result in excessive quality.

However, in cases in which, for example, the battery cell housing part is configured by a cast article including a first side wall part, a support wall part, and a second side wall part, it is difficult to secure the tensile strength and rigidity of only the second side wall part.

Here, in the present disclosure, the battery cell housing part includes a first component and a pair of second components. The first component includes a pair of first side wall parts and a support wall part.

The second component includes the second side wall part, and a pair of third side wall parts provided continuously with the second side wall part at one side and the other side, in the third direction, of the second side wall part, and joined to the first side wall part. Accordingly, by configuring only the second component from a material with a large tensile strength or a material with a large plate thickness, the tensile strength and rigidity with respect to the restoring force of the battery cell in the battery cell housing part can be secured.

A battery pack case according to a third aspect of the present disclosure is the second aspect, in which a main flow path part is provided integrally with the support wall part at the another side, in the second direction, of the support wall part, the main flow path part configuring a part of the cooling air flow path part, extending in the first direction, and being configured to supply the cooling air to the battery cell, and the flow path forming part includes: an end part structural part provided integrally with a portion of the first component at one side in the first direction and with the one side, in the first direction, of the second component, and configuring an end of the cooling air flow path part; and an air vent part provided integrally with a portion of the first component at another side in the first direction and with the another side, in the first direction, of the second component, and configured to connect to a blower part configured to supply the cooling air to the cooling air flow path part.

In the third aspect of the present disclosure, a main flow path part configuring a part of the cooling air flow path part is provided integrally with the support wall part at the other side, in the second direction, of the support wall part of the first component, and the main flow path part extends in the first direction. Accordingly, the cooling air flows through the main flow path part in the first direction, and the cooling air is supplied from the main flow path part to the battery cells.

Since the battery cell housing part is made of metal, in order to mold the first component and the second component configuring the battery cell housing part by press working or the like, it is preferable to be able to simplify the shapes of these components.

Further, the cooling air flow path part needs to be provided with a portion configuring an end part of the cooling air flow path part and a portion connected to a blower part that supplies the cooling air to the cooling air flow path part. However, providing these components in the first component or the second component complicates the shape of these components, making it difficult to mold these components by press working.

Here, in the present disclosure, the flow path forming part made of resin includes an end structural part configuring an end part of the cooling air flow path part, and an air vent part that is connectable to a blower part. The end structural part is provided integrally with a portion of the first component at the one side in the first direction and with the second component at the one side in the first direction. The air vent part is provided integrally with a portion of the first component at the other side in the first direction and with the second component at the other side in the first direction.

For this reason, in the present disclosure, it is possible to configure a portion of the cooling air flow path part, of which the configuration can easily become complex, with a flow path forming part made of a resin, as a result of which the shapes of the first component and the second component can be simplified to shapes that can be molded by press working or the like.

A battery pack case according to a fourth aspect of the present disclosure is the second or third aspect, in which plural of the battery cell housing parts are disposed in a consecutive manner in the third direction, and the battery cell housing part further includes: a first connection member, made of metal, that connects together the second side wall parts at the one end in the first direction; and a second connection member, made of metal, that connects together the second side wall parts at the other end in the first direction.

In the fourth aspect of the present disclosure, plural battery cell housing parts are disposed consecutively in the third direction, enabling the capacity for accommodating the battery cells to be enlarged. Moreover, in the battery cell housing parts disposed consecutively in the third direction, the second side wall parts at the one side in the first direction are connected to each other by a first connection member made of a metal, and the second side wall portions at the other side in the first direction are connected to each other by a second connection member made of metal. Accordingly, in the present disclosure, the first connection member can reinforce the second side wall parts at the one side in the first direction, and the second connection member can reinforce the second side wall parts at the other side in the first direction.

A battery pack case according to a fifth aspect of the present disclosure is the fourth aspect, in which a bead part, which extends in the third direction and projects toward an opposite side from the battery cell, is provided at each of the second side wall part, the first connection part, and the second connection part.

In the fifth aspect of the present disclosure, the second side wall part of the second component, the first connection member, and the second connection member are provided with bead parts, and the bead part extends in the third direction and protrudes toward an opposite side from the battery cell. This enables the rigidity of each of the second side wall part, the first connection member, and the second connection member with respect to the restoring force of the battery cell to be secured in the present disclosure.

As explained above, the battery pack case according to the first aspect of the present disclosure has the excellent advantageous effects of ensuring a flow path for cooling air in the battery cells while maintaining the battery cells in a stable state, and further suppressing any increase in weight.

The battery pack case according to the second aspect of the present disclosure has the excellent advantageous effect of preventing excessive quality while ensuring tensile strength and rigidity relative to the restoring force of the battery cell.

The battery pack case according to the third aspect of the present disclosure has the excellent advantageous effect of enabling manufacturing efficiency to be improved.

The battery pack case according to the fourth aspect of the present disclosure has the excellent advantageous effect of enabling the power capacity to be secured and also enabling the battery cell to be reinforced relative to restoring force.

The battery pack case according to the fifth aspect of the present disclosure has the excellent advantageous effect of enabling rigidity relative to the restoring force of the battery cell to be improved.

BRIEF DESCRIPTION OF THE DRAWINGS

Exemplary embodiments of the present disclosure will be described in detail based on the following figures, wherein:

FIG. 4 is a plan view illustrating a configuration of a metal portion configuring a battery pack case according to the present exemplary embodiment;

DETAILED DESCRIPTION

Figure 1:
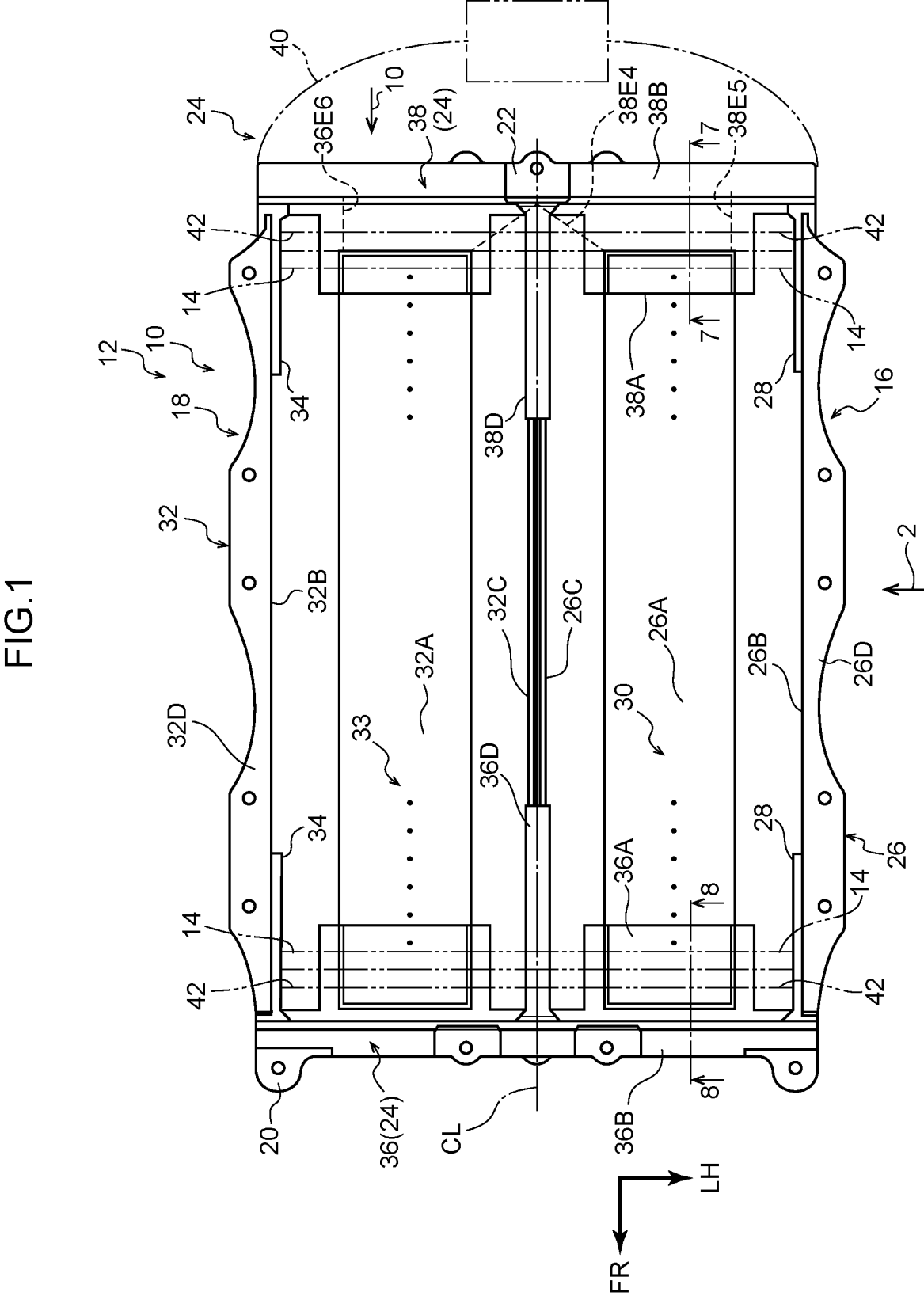
FIG. 1 is a plan view schematically illustrating a configuration of a battery pack case according to the present exemplary embodiment.
Figure 2:
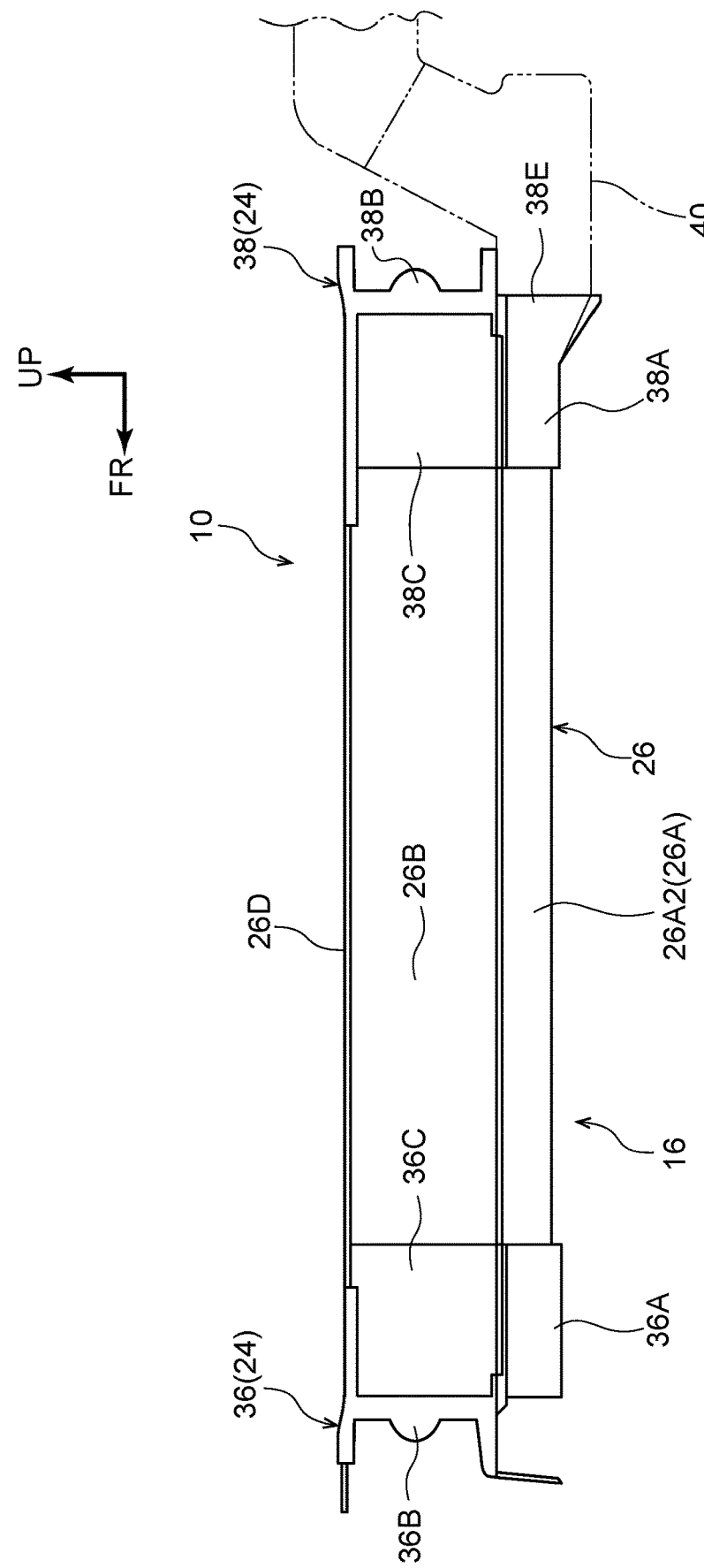
FIG. 2 is a side view (viewed along the direction of arrow 2 in FIG. 1) schematically illustrating a configuration of a battery pack case according to the present exemplary embodiment.

Explanation follows regarding an example of an exemplary embodiment of a battery pack case according to the present disclosure, with reference to FIG. 1 to FIG. 10. A battery pack case 10 according to the present exemplary embodiment configures the outer shell of a battery pack 12 installed in a vehicle (not shown) such as a hybrid car, a plug-in hybrid car, or an electric vehicle, and holds plural battery cells 14 as described below.

In the drawings, the arrow FR indicates a front side in a front-rear direction of the battery pack 12, the arrow UP indicates an upper side in a height direction of the battery pack 12, and the arrow LH indicates a left side in a left-right direction of the battery pack 12.

Further, unless otherwise noted below, the front side of the battery pack 12 in the front-rear direction is referred to as one side in a first direction, the upper side of the battery pack 12 in the height direction is referred to as one side in a second direction, and the left side of the battery pack 12 in the left-right direction is referred to as one side in a third direction.

As illustrated in FIG. 1, the battery pack case 10 is configured with linear symmetry with respect to a center line CL extending in the first direction, as viewed from the second direction. The battery pack case 10 includes a metal battery cell housing part 16 and battery cell housing part 18, a connection member 20 serving as a first connection member, a connection member 22 serving as a second connection member, and a resin flow path forming part 24.

Figure 3:
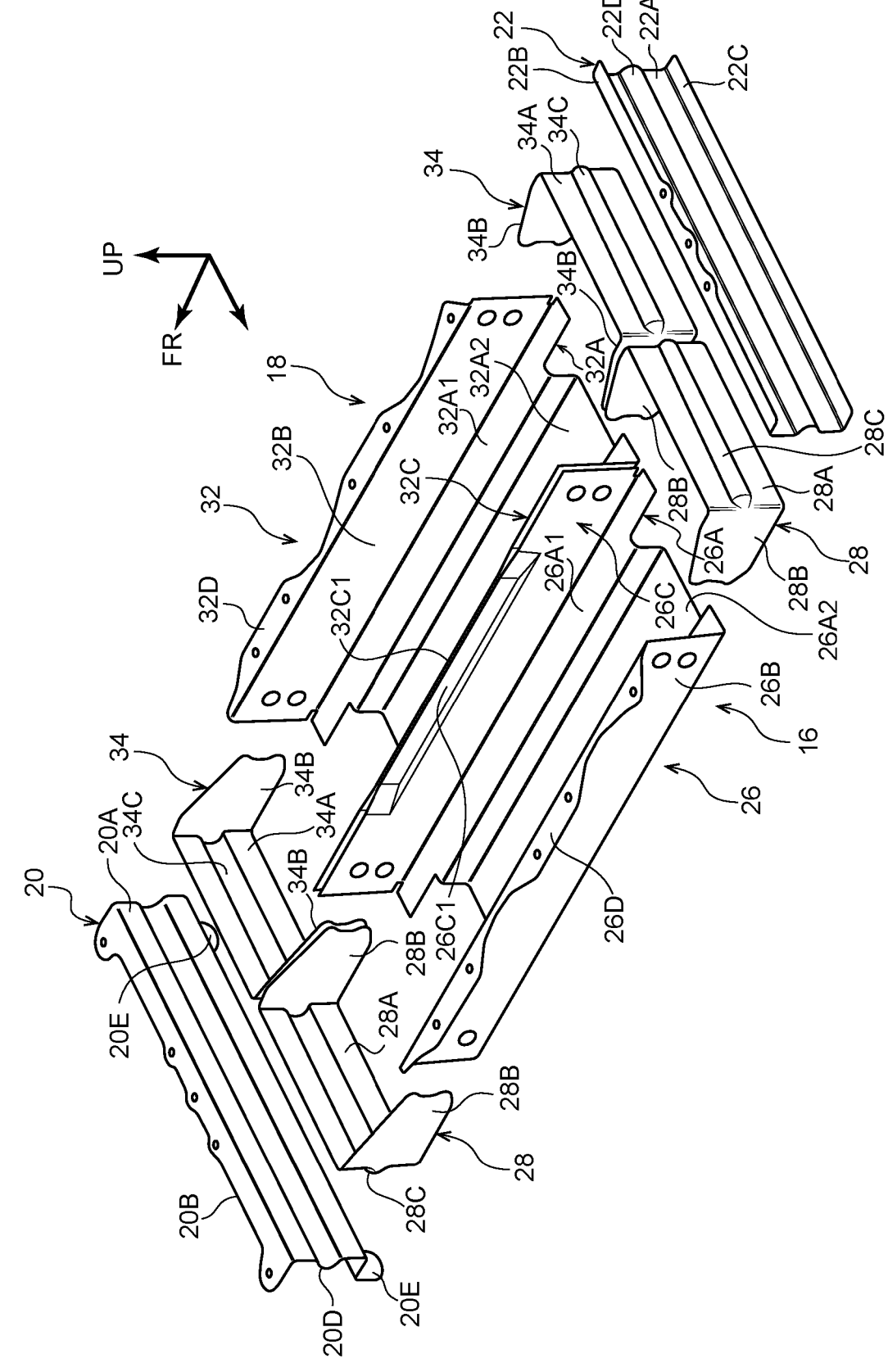
FIG. 3 is an exploded perspective view illustrating a configuration of a metal portion configuring a battery pack case according to the present exemplary embodiment.
Figure 4:
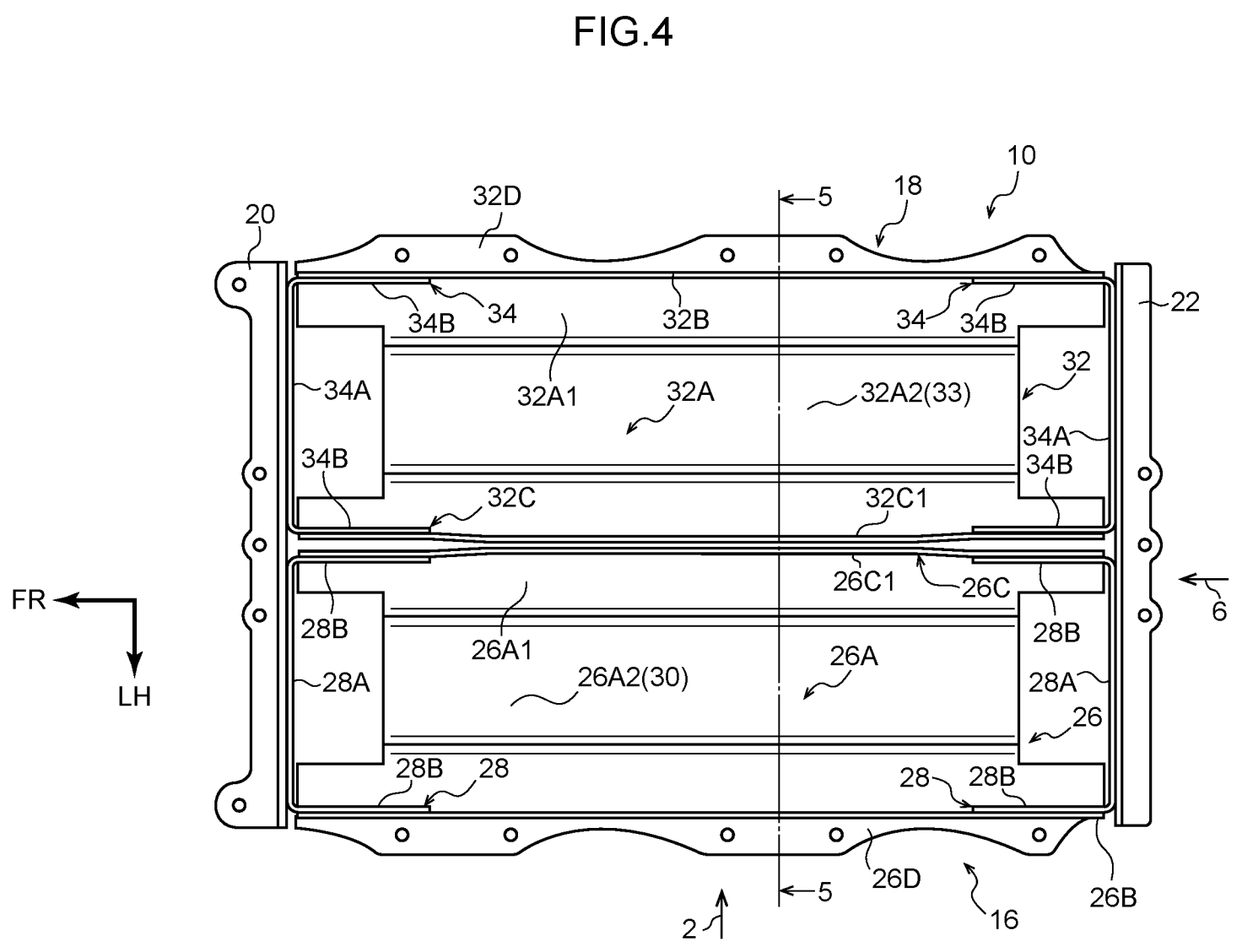
Figure 5:
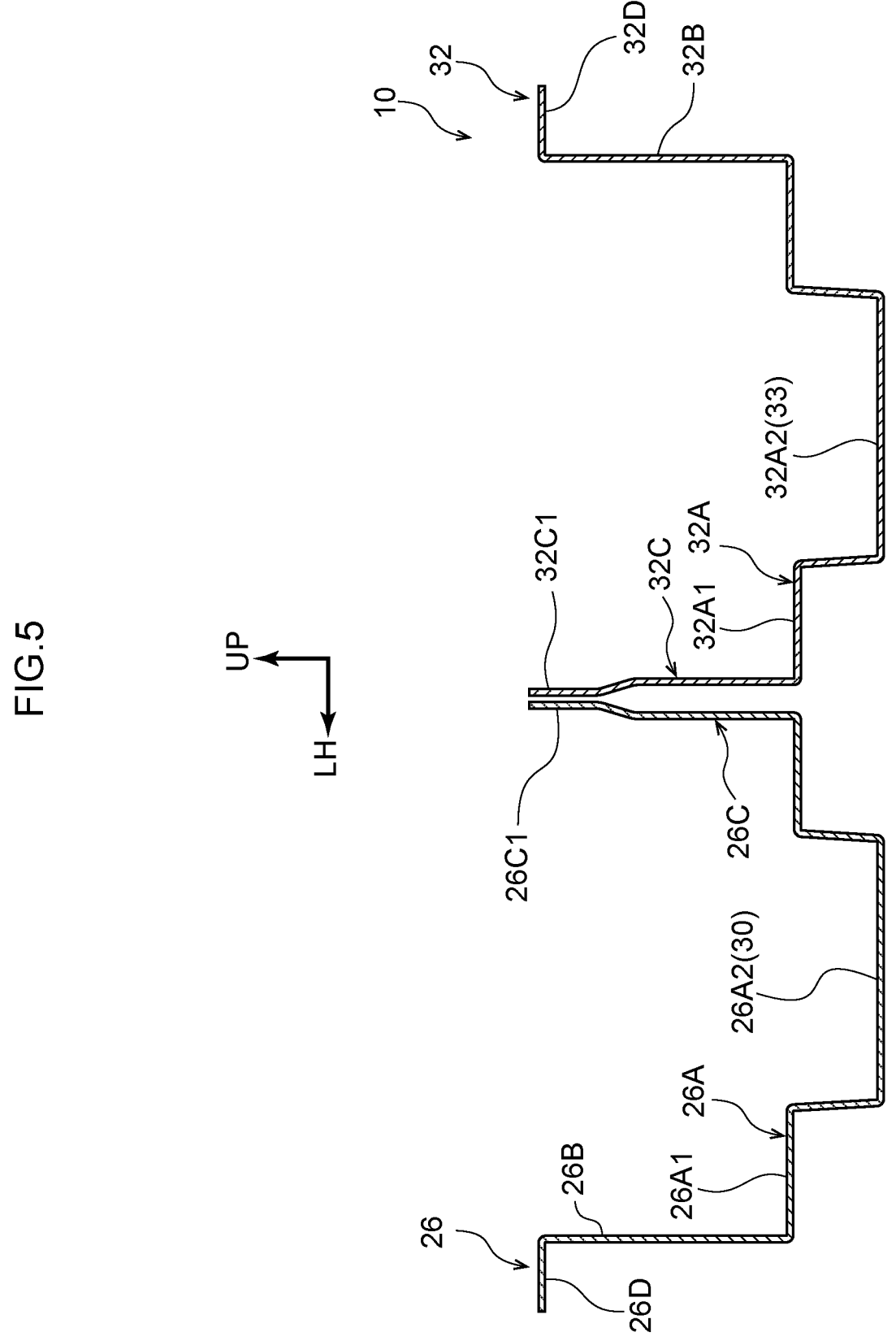
FIG. 5 is a cross-sectional view schematically illustrating a configuration of a metal portion configuring a battery pack case according to the present exemplary embodiment (cross-sectional view illustrating a state sectioned along the line 5-5 in FIG. 4)

As illustrated in FIG. 3 to FIG. 5, the battery cell housing part 16 includes a main body part 26 serving as a first component and an end part 28 serving as a pair of second components.

Specifically, as an example, the main body part 26 is formed by pressing a steel plate with a tensile strength of 270 MPa and a thickness of 0.6 mm, and includes a lower wall part 26A, a side wall part 26B serving as a first side wall part, and a side wall part 26C serving as a first side wall part. The lower wall part 26A extends in the first direction, a portion at one side and a portion at the other side in the third direction are configured by a support wall portion 26A1 having a thickness direction in the second direction, and a battery cell 14 is supported from the other side in the second direction by the support wall part 26A1.

A portion at a central region in the third direction of the lower wall part 26A is provided with a main flow path part 26A2 that is integral with the support wall part 26A1, the main flow path part 26A2 configuring a part of a cooling air flow path part 30 for supplying cooling air to the battery cell 14. This main flow path part 26A2 is disposed at the other side in the second direction of the support wall part 26A1, and is formed in a rectangular shape that extends in the first direction when viewed from the second direction, and in a U-shape that is open at the one side in the second direction when viewed from the first direction.

The main flow path part 26A2 is not provided at an end at one side in the first direction or at an end at the other side in the first direction of the support wall part 26A1, and a central part of a peripheral edge portion of the lower wall part 26A at the one side in the first direction and a peripheral edge portion at the other side in the first direction are configured in a state that is recessed in a rectangular shape toward a central portion of the lower wall part 26 A as viewed from the second direction.

The side wall portion 26B is formed in a plate-like shape extending from a peripheral edge portion at one side in the third direction of the lower wall portion 26A toward the one side in the second direction, with the third direction serving as a plate thickness direction, and a flange portion 26D extends from a peripheral edge portion of the side wall portion 26B at the one side in the second direction toward the one side in the third direction.

Further, the side wall part 26C, overall, is plate-shaped, extending from a peripheral edge part of the lower wall part 26A at the other side in the third direction to the one side in the second direction, with the third direction as a plate thickness direction. Moreover, at a portion at the one side in the second direction of the side wall part 26C, an expansion part 26C1 that expands toward the other side in the third direction is provided at a portion excluding an end portion at the one side in the first direction and an end portion at the other side in the first direction. The side wall part 26B and the side wall part 26C support the battery cell 14 in the third direction.

The end part 28 is disposed with respect to each of an end part at the one side in the first direction and an end part at the other side in the first direction of the main body part 26. As an example, the end part 28 is formed by pressing a steel plate with a tensile strength of 980 MPa and a thickness of 1.6 mm, and is configured by a main wall part 28A serving as a second side wall part, and a side wall part 28B serving as a pair of third side wall parts.

Figure 7:
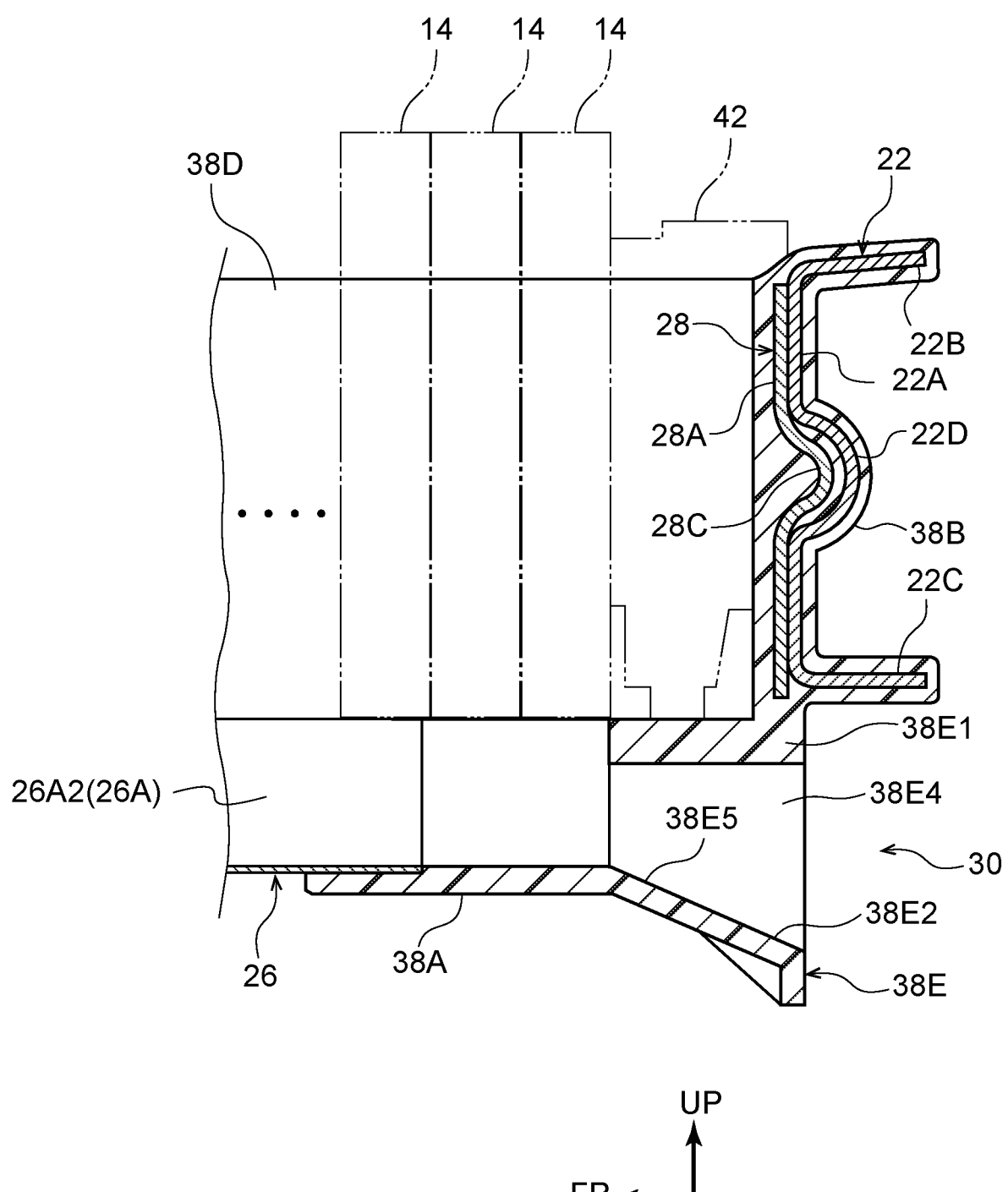
FIG. 7 is a partial cross-sectional view schematically illustrating a configuration of a battery pack case according to the present exemplary embodiment (cross-sectional view illustrating a state sectioned along the line 7-7 in FIG. 1)
Figure 8:
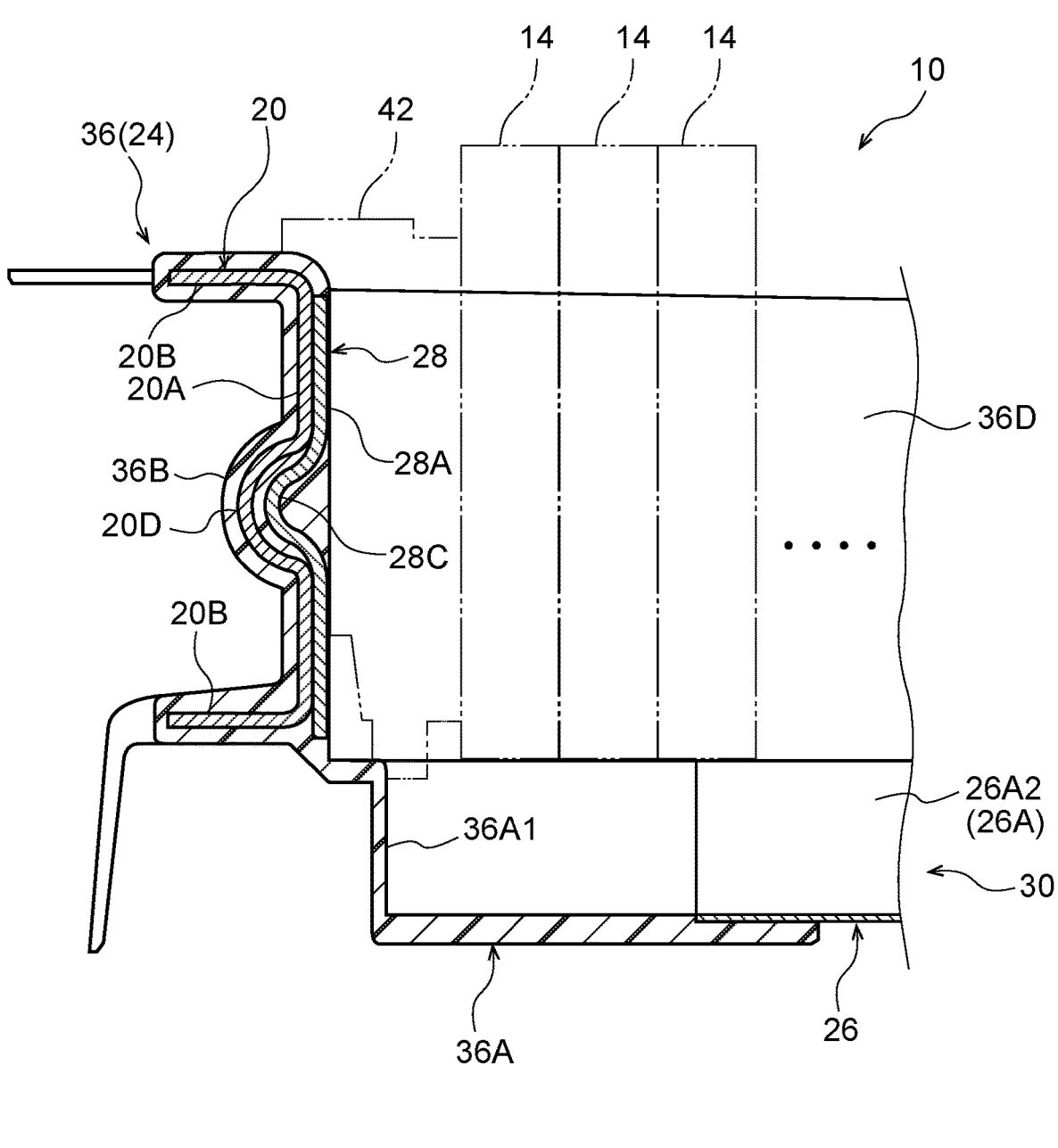
FIG. 8 is a partial cross-sectional view schematically illustrating a configuration of a battery pack case according to the present exemplary embodiment (cross-sectional view illustrating a state sectioned along the line 8-8 in FIG. 1)

The main wall part 28A is formed in a rectangular plate shape extending in a third direction with the first direction as a thickness direction, and as illustrated in FIG. 7 and FIG. 8, a bead part 28C is provided at a central part in the second direction. The bead part 28C extends in the third direction, and projects from the main wall part 28A toward an opposite side from a central part of the lower wall part 26A—namely, toward an opposite side from the battery cell 14—and has a cross-sectional shape seen from the third direction that is an arcuate shape. The main wall part 28A supports the battery cell 14 in the first direction at an opposite surface from the bead part 28C.

Further, the side wall part 28B is formed in a plate shape extending from each of a peripheral edge part at the one side in the third direction and a peripheral edge part at the other side in the third direction of the main wall part 28A, with a plate thickness direction being the third direction, toward a side of the central part of the lower wall part 26A. Namely, the end part 28 is U-shaped, being open toward a side of the central part of the lower wall part 26A as viewed from the second direction.

Moreover, the side wall part 28B is trapezoidal in shape and narrows toward the side of the central part of the lower wall part 26A as viewed from the third direction, and is joined to either the side wall part 26B or the side wall part 26C via a joint part such as spot welding (not shown) in a state in which the side wall part 28B is abutted to the lower wall part 26A from a central side in the third direction.

The battery cell housing part 18 includes a main body part 32 serving as a first component, and an end part 34 serving as a pair of second components, and is disposed at the one side, in the third direction, of the battery cell housing part 16 so as to be continuous with the battery cell housing part 16.

Specifically, as an example, the main body part 32 is formed by pressing a steel plate having a tensile strength of 270 MPa and a thickness of 0.6 mm. The main body part 32 includes a lower wall part 32A that is configured similarly to the lower wall part 26A, a side wall part 32B serving as a first side wall part, configured similarly to the side wall part 26B, and a side wall part 32C serving as a first side wall part, configured similarly to the side wall part 26C.

The lower wall part 32A includes a support wall part 32A1 that supports the battery cell 14 from the other side in the second direction, and a main flow path part 32A2 configuring a part of a cooling air flow path part 33 for supplying cooling air to the battery cell 14.

Moreover, in the present exemplary embodiment, a side wall part 32B configures a portion at the other side in the third direction of the main body part 32, and a side wall part 32C configures a portion at the one side in the third direction of the main body part 32. Further, a flange part 32D extends from a peripheral edge part of the side wall part 32B at the one side in the second direction toward the other side in the third direction.

The side wall part 32C configures a portion at the one side in the third direction of the main body part 32, is adjacent to the side wall part 26C, and has an expansion part 32C1 that is joined to the expansion part 26C1 via a joint part such as spot welding (not shown) in a state in which the expansion part 32C1 is in contact with the expansion part 26C1. In FIG. 4 and FIG. 5, in order to facilitate understanding of the configuration of the expansion part 26C1 and the expansion part 32C1, the expansion part 26C1 and the expansion part 32C1 are illustrated separately.

The end part 34 is disposed with respect to each of an end part at the one side in the first direction and an end part at the other side in the first direction of the main body part 32. As an example, the end part 34 is formed by pressing a steel plate having a tensile strength of 980 MPa and a thickness of 1.6 mm. The end part 34 includes a main wall part 34A serving as a second side wall part and a side wall part 34B serving as a pair of third side wall parts. The configuration is similar to that of the end part 28.

The main wall part 34A is configured similarly to the main wall part 28A, and a bead part 34C is provided at the main wall part 34A. The main wall part 34A supports the battery cell 14 in the first direction at an opposite surface from the bead part 34C.

The side wall part 34B is configured similarly to the side wall part 28B, and extends from each of a peripheral edge part at the one side in the third direction and a peripheral edge part at the other side in the third direction of the main wall part 34A, with a plate thickness direction in the third direction, toward a side of a central part of the lower wall part 26A. Moreover, the side wall part 34B is joined to either the side wall part 32B or the side wall part 32C via a joining part such as spot welding (not shown) in a state in which the side wall part 34B is abutted to the lower wall part 32A from a central side in the third direction.

As an example, the connection member 20 is formed by pressing a steel plate with a tensile strength of 780 MPa and a thickness of 2.0 mm, and as illustrated in FIG. 3 and FIG. 8, is disposed at the one side, in the first direction, of the battery cell housing part 16 and the battery cell housing part 18.

Specifically, the connection member 20 includes a main wall part 20A, an upper flange part 20B, a lower flange part 20C, and an extending wall part 20E. The main wall part 20A is formed in a rectangular plate shape extending in the third direction with the first direction as a thickness direction, and is joined to the main wall part 28A of the end part 28 at the one side in the first direction and the main wall part 34A of the end part 34 at the one side in the first direction via a joint part such as welding (not shown). Namely, the connection member 20 connects the main wall part 28A and the main wall part 34A in the third direction at the one side of the first direction.

A bead part 20D is provided at a central part, in the second direction, of the main wall part 20A. The bead part 20D extends in the third direction, projects from the main wall part 20A toward an opposite side from the battery cell housing part 16 and the battery cell housing part 18—namely toward the opposite side from the battery cell 14—and has a cross-sectional shape seen from the third direction that is an arcuate shape. The bead part 20D is disposed at a position overlapping with the bead part 28C of the battery cell housing part 16 and the bead part 34C of the battery cell housing part 18 as viewed from the first direction, and is spaced apart therefrom in the first direction.

The upper flange part 20B extends from a peripheral edge part of the main wall part 20A at the one side in the second direction, toward the one side in the first direction, has the second direction as the plate thickness direction, and is formed in a plate shape extending in the third direction.

Further, the lower flange part 20C extends from a peripheral edge part of the main wall part 20A at the other side in the second direction, toward the one side in the first direction, has the second direction as the plate thickness direction, and is formed in a plate shape extending in the third direction. Moreover, at each of the end part at the one side in the third direction and the end part at the other side in the third direction of the lower flange part 20C, an extending wall part 20E is provided that extends from a peripheral edge part of the lower flange part 20C at the one side in a first direction, toward the other side in the second direction.

The connection member 20 is connected to electronic device units (not shown) including plural electronic devices, and the electronic device units are supplied with power from the battery cell 14.

Figure 6:
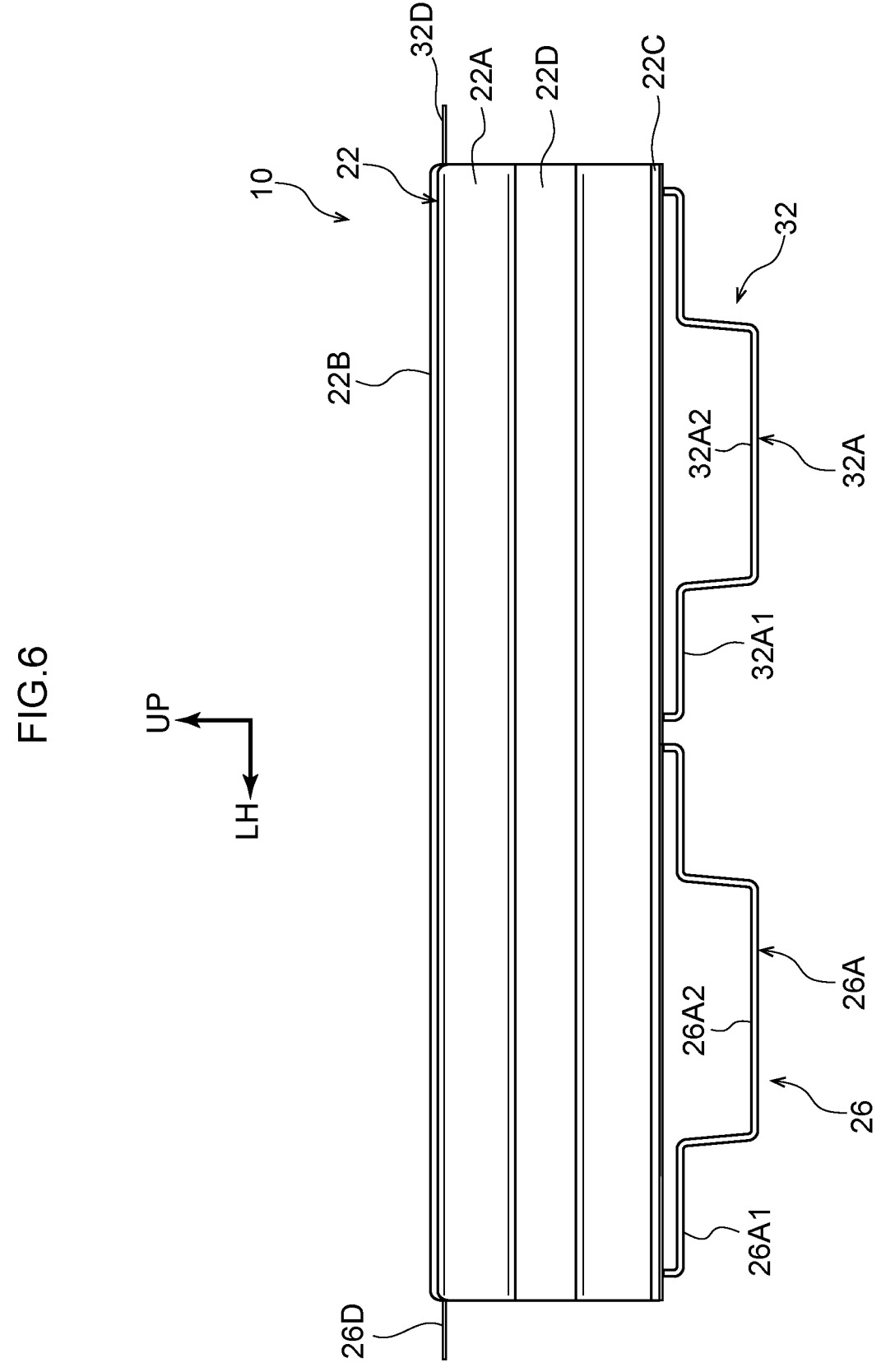
FIG. 6 is a rear view schematically illustrating a configuration of a metal portion configuring a battery pack case according to the present exemplary embodiment (viewed along the direction of arrow 6 in FIG. 4)

Further, as an example, the connection member 22 is formed by pressing a steel plate with a tensile strength of 780 MPa and a thickness of 2.0 mm, and as illustrated in FIG. 3, FIG. 6, and FIG. 7, is disposed at the other side in the first direction relative to the battery cell housing part 16 and the battery cell housing part 18.

Specifically, the connection member 22 includes a main wall part 22A, an upper flange part 22B, and a lower flange part 22C. The main wall part 22A is formed in a rectangular plate shape extending in the third direction with the first direction as a plate thickness direction, and is joined to the main wall part 28A of the end part 28 at the other side in the first direction and the main wall part 34A of the end part 34 at the other side in the first direction via a joint part such as spot welding (not shown). Namely, the connection member 22 connects the main wall part 28A and the main wall part 34A in the third direction at the other side in the first direction.

A bead part 22D is provided at a central part of the main wall part 22A in the second direction. The bead part 22D extends in the third direction, and projects from the main wall part 22A toward an opposite side from the battery cell housing part 16 and the battery cell housing part 18—namely, toward an opposite side from the battery cell 14—and has a cross-sectional shape seen from the third direction that is an arcuate shape. Moreover, the bead part 22D is disposed at a position overlapping with the bead part 28C of the battery cell housing part 16 and the bead part 34C of the battery cell housing part 18 as viewed from the first direction, and is spaced apart therefrom in the first direction.

The upper flange part 22B extends from a peripheral edge part of the main wall part 22A at the one side in the second direction, toward the other side in the first direction, has the second direction as the plate thickness direction, and is formed in a plate shape extending in the third direction. Further, the lower flange part 22C extends from a peripheral edge part at the other side, in the second direction, of the main wall part, 22A toward the other side in the first direction, has the second direction as the plate thickness direction, and is formed in a plate shape extending in the third direction.

Next, explanation follows regarding the configuration of the flow path forming part 24, with reference to FIG. 1, FIG. 2, and FIG. 7 to FIG. 10. The flow path forming part 24 is injection-molded with a predetermined resin, and is thereby provided integrally with the battery cell housing part 16, the battery cell housing part 18, the connection member 20, and the connection member 22 described above. Namely, the battery pack case 10 is a composite molded article of a metal member and a resin member.

Specifically, the flow path forming part 24 includes an end part structural part 36 configuring a portion at the one side in the first direction and configuring an end part of the cooling air flow path part 30 and the cooling air flow path part 33, and an air vent part 38 configuring a portion at the other side in the first direction.

The end structural part 36 includes a lower structural part 36A configuring a portion at the other side in the second direction, a front structural part 36B configuring a portion at the one side in the first direction, a pair of side structural parts 36C configuring an outer portion, in the third direction, of the battery pack case 10, and a front partition wall part 36D.

The lower structural part 36A is configured in a hat shape in which a cross section of a main portion thereof, viewed from the first direction, is open toward the one side in the second direction, and covers portions of the main body part 26 and the main body part 32 at the one side in the first direction from the other side in the second direction. Specifically, the lower structural part 36A closes a recessed portion at an end part, in the first direction, of the lower wall part 26A of the main body part 26 and of the lower wall part 32A of the main body part 32, and at the other side in the second direction, links together the main body part 26, the main body part 32, the end part 28, and the end part 34.

The lower structural part 36A includes a front wall part 36A1, and the front wall part 36A1 is located at the other side, in the second direction, of the main wall part 28A of the end part 28 and of the main wall part 34A of the end part 34, and extends in the third direction. That is, the lower structural part 36A can be viewed as a portion configuring a part of the cooling air flow path part 30 and the cooling air flow path part 33 in the end structural part 36.

The front structural part 36B covers the main wall part 28A of the end part 28, the main wall part 34A of the end part 34, and the connection member 20. A part of the front structural part 36B is inserted between the bead part 20D, and the bead part 28C and the bead part 34C, and these parts configure a sandwich structure layered in the first direction at a portion at the one side of the battery pack case 10 in the first direction.

The side structural part 36C is provided continuously with the front structural part 36B and extends toward the other side in the first direction, and covers the side wall part 28B and the side wall part 34B at an outer side, in the third direction, of the battery pack case 10.

The front partition wall part 36D extends from the front structural part 36B toward the other side in the first direction, and covers the side wall part 26C and the side wall part 32C at the one side in the first direction.

The air vent part 38 includes a lower structural part 38A configuring the other side in the second direction, a rear structural part 38B configuring the other side in the first direction, a pair of side configuring parts 38C configuring a portion at an outer side in the third direction of the battery pack case 10, a rear partition wall part 38D, and an opening 38E.

The lower structural part 38A is hat-shaped with a cross section as viewed from the first direction that is open at the one side in the second direction, and covers portions of the main body part 26 and the main body part 32 at the other side in the first direction from the other side in the second direction. Specifically, the lower structural part 38A closes off a recessed portion at the other end of the lower wall part 26A of the main body part 26 and the lower wall part 32A of the main body part 32 in the first direction, and at the other side in the second direction, links together the main body part 26, the main body part 32, the end part 28, and the end part 34.

The rear structural part 38B covers the main wall part 28A of the end part 28, the main wall part 34A of the end part 34, and the connection member 22. A part of the rear structural part 38B is inserted between the bead part 22D, and the bead part 28C and the bead part 34C, and these parts configure a sandwich structure layered in the first direction at a portion at the other side, in the first direction, of the battery pack case 10.

The side structural part 38C is provided continuously with the rear structural part 38B and extends toward the one side in the first direction, and covers the side wall part 28B and the side wall part 34B at an outer side, in the third direction, of the battery pack case 10.

The rear partition wall part 38D extends from the rear structural part 38B toward the other side in the first direction, and covers the side wall part 26C and the side wall part 32C at the other side in the first direction.

The opening 38E is provided at the other side, in the second direction, of the rear structural part 38B as viewed from the first direction. The opening 38E includes an upper wall part 38E1 configuring a portion at an upper side in the second direction, a lower wall part 38E2 configuring a portion at the other side in the second direction, and a pair of outer wall parts 38E3 that link the upper wall part 38E1 and the lower wall part 38E2 in the second direction at an outer side, in the third direction, of the battery pack case 10.

Specifically, the upper wall part 38E1 extends from a peripheral edge at the other side, in the second direction, of the rear structural part 38B, toward the one side in the first direction, with the second direction as a plate thickness direction, and extends in the third direction. Further, the lower wall part 38E2 extends from a peripheral edge of the bottom of the lower structural part 38A at the other side in the first direction, toward the other side in the first direction and the other side in the second direction, and extends in the third direction.

A central part, in the third direction, of the upper wall part 38E1 and a central part, in the third direction, of the lower wall part 38E2 are linked in the second direction by a branch part 38E4. Specifically, the branch part 38E4 has a triangular shape in which the outer peripheral shape widens from the other side in the first direction toward the one side in the first direction as viewed from the second direction, and the opening 38E is branched by the branch part 38E4 into a first inflow port part 38E5 at the other side in the third direction and a second inflow port part 38E6 at the one side in the third direction. The first inflow port part 38E5 configures a part of the cooling air flow path part 30, and the second inflow port part 38E6 configures a part of the cooling air flow path part 33.

The opening 38E is connected to a blower 40 serving as a blower part, and the blower 40 is driven so as to supply cooling air blown from the blower 40 to the cooling air flow path part 30 and the cooling air flow path part 33.

Moreover, in the battery cell housing part 16 and the battery cell housing part 18 of the battery pack case 10 configured as described above, the plural battery cells 14 are respectively housed from the one side in the second direction in a state in which they are stacked and compressed in the first direction. An end plate 42 is disposed on each of the one side in the first direction and the other side in the first direction of the stacked battery cells 14.

Moreover, in the battery cell housing part 16, the cooling air flow path part 30 is opened at the other side, in the second direction, of the battery cell 14, and in the battery cell housing part 18, the cooling air flow path part 33 is opened at the other side, in the second direction, of the battery cell 14. The cooling air from the blower 40 is supplied to the battery cell 14 through the cooling air flow path part 30 and the cooling air flow path part 33.

Mechanism and Effects of the Exemplary Embodiment

Next, explanation follows regarding the mechanism and advantageous effects of the present exemplary embodiment.

As illustrated in FIG. 1, in the present exemplary embodiment, the battery pack case 10 includes the battery cell housing part 16 and the battery cell housing part 18, which are made of metal, and at these, plural battery cells 14 stacked in the first direction are housed from the one side in the second direction in a state in which the battery cells 14 are compressed in the first direction. The restoring force of the battery cell 14 is supported by the battery cell housing part 16 and the battery cell housing part 18.

Since the battery cells 14 generate heat during charging and discharging, the battery pack case 10 preferably includes a flow path for cooling air that cools the battery cells 14. However, when an attempt is made to provide cooling air flow paths in all of the battery cell housing parts 16 and the battery cell housing parts 18, which are made of metal, these structures become complex, and need to be configured by cast products. However, this kind of configuration may increase the weight of the battery pack case 10.

Here, in the present exemplary embodiment, the flow path forming part 24 is provided integrally with the battery cell housing part 16 and the battery cell housing part 18, and a part of the flow path forming part 24 is disposed at the other side, in the second direction, of the battery cell 14, configuring a part of the cooling air flow path part 30 and the cooling air flow path part 33, through which cooling air flows through the battery cell 14.

Accordingly, in the present exemplary embodiment, portions of the cooling air flow path part 30 and the cooling air flow path part 33 that are complex in shape are formed by the flow path forming part 24 made of resin, whereby the configuration of the battery cell housing part 16 and the battery cell housing part 18 can be kept from becoming overly complicated while also securing a flow path for cooling air to cool the battery cells 14.

Accordingly, in the battery pack case 10 according to the present exemplary embodiment, the cooling air flow path of the battery cell 14 can be secured while maintaining the battery cells 14 in a stable state, and further suppressing any increase in weight.

In the present exemplary embodiment, as illustrated in FIG. 3 and FIG. 4, the battery cell housing part 16 includes the side wall part 26B and the side wall part 26C, which extend in the first direction and are capable of supporting the battery cell 14 in the third direction, the support wall part 26A1, which supports the battery cell 14 from the other side in the second direction, and the main wall part 28A, which is capable of supporting the battery cell 14 in the first direction.

Further, the battery cell housing part 18 includes the side wall part 32B and the side wall part 32C, which extend in the first direction and are capable of supporting the battery cell 14 in the third direction, the support wall 32A1, which supports the battery cell 14 from the other side in the second direction, and the main wall part 34A, which is capable of supporting the battery cell 14 in a first direction.

Incidentally, in the battery cell housing part 16 and the battery cell housing part 18 configured as described above, since the restoring force of the battery cell 14 mainly acts on the main wall part 28A and the main wall part 34A, it is preferable that the tensile strength and rigidity thereof with respect to the restoring force of the battery cells 14 be ensured.

Further, since the restoring force of the battery cell 14 does not act directly on the side wall part 26B, the side wall part 26C, the side wall part 32B, the side wall part 32C, the support wall part 26A1, or the support wall part 32A1, for these parts, actively ensuring the tensile strength and rigidity relative to the restoring force of the battery cell 14 will result in excessive quality.

However, in cases in which, for example, the battery cell housing part 16 is configured by a cast article including the side wall part 26B, the side wall part 26C, the support wall part 26A1, and the main wall part 28A, it is difficult to secure the tensile strength and rigidity of only the main wall part 28A. Similarly, in cases in which the battery cell housing part 18 is configured by a cast article including the side wall part 32B, the side wall part 32C, the support wall part 32A1, and the main wall part 34A, it is difficult to secure the tensile strength and rigidity of only the main wall part 34A.

Here, in the present exemplary embodiment, the battery cell housing part 16 includes a main body part 26 and a pair of end parts 28. The main body part 26 includes the side wall part 26B, the side wall part 26C, and the support wall part 26A1.

The end part 28 includes the main wall part 28A and a pair of side wall parts 28B, which are provided continuously with the main wall part 28A at the one side and the other side, in the third direction, of the main wall part 28A, and are joined to the side wall part 26B or the side wall part 26C.

The battery cell housing part 18 includes a main body part 32 and a pair of end parts 34. The main body part 32 includes a side wall part 32B, a side wall part 32C, and a support wall part 32A1.

The end part 34 includes the main wall part 34A and a pair of side wall parts 34B, which are provided continuously with the main wall part 34A on the one side and the other side, in the third direction, of the main wall part 34A, and are joined to the side wall part 32B or the side wall part 32C.

By configuring the end part 28 and the end part 34 with a material with high tensile strength or a thick plate thickness, the tensile strength and rigidity of the battery cell housing part 16 and the battery cell housing part 18 with respect to the restoring force of the battery cell 14 can be secured.

Accordingly, in the present exemplary embodiment, it is possible to keep the battery pack case 10 from being configured with excessive quality, while also securing the tensile strength and rigidity of the battery pack case 10 with respect to the restoring force of the battery cells 14.

In the present exemplary embodiment, as illustrated in FIG. 1 and FIG. 5, a main flow path part 26A2 configuring a part of the cooling air flow path part 30 is provided integrally with the support wall part 26A1 at the other side, in the second direction, of the support wall part 26A1 of the main body part 26, and the main flow path part 26A2 extends in the first direction.

Moreover, a main flow path part 32A2 configuring a part of the cooling air flow path part 33 is provided integrally with the support wall part 32A1 at the other side, in the second direction, of the support wall part 32A1 of the main body part 32, and the main flow path part 32A2 extends in the first direction. Accordingly, the cooling air flows through the main flow path part 26A2 and the main flow path part 32A2 in the first direction, and the cooling air is supplied from the main flow path part 26A2 and the main flow path part 32A2 to the battery cell 14.

Here, since the battery cell housing part 16 is made of metal, in order to mold the main body part 26 and the end part 28 configuring the battery cell housing part 16 by pressing or the like, it is preferable to be able to simplify the shapes of these components. This also applies to the battery cell housing part 18.

Further, the cooling air flow path part 30 needs to be provided with a portion configuring an end part of the cooling air flow path part 30, and a portion connected to the blower 40 that supplies cooling air to the cooling air flow path part 30. Further, the cooling air flow path part 33 needs to be provided with a portion configuring an end part of the cooling air flow path part 33 and a portion connected to the blower 40. However, if these components are provided in the main body part 26, the main body part 32, the end part 28, and the end part 34, since the shapes of these components will become complex, it is difficult to mold these components by pressing.

Figure 9:
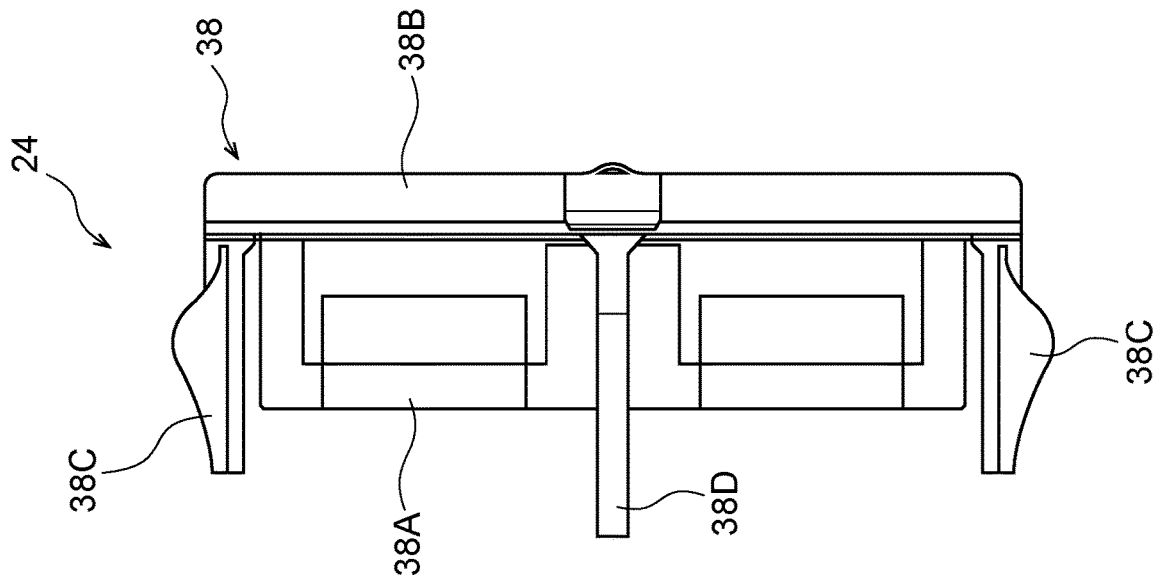
FIG. 9 is a plan view schematically illustrating a configuration of a resin portion configuring a battery pack case according to the present exemplary embodiment.
Figure 9:
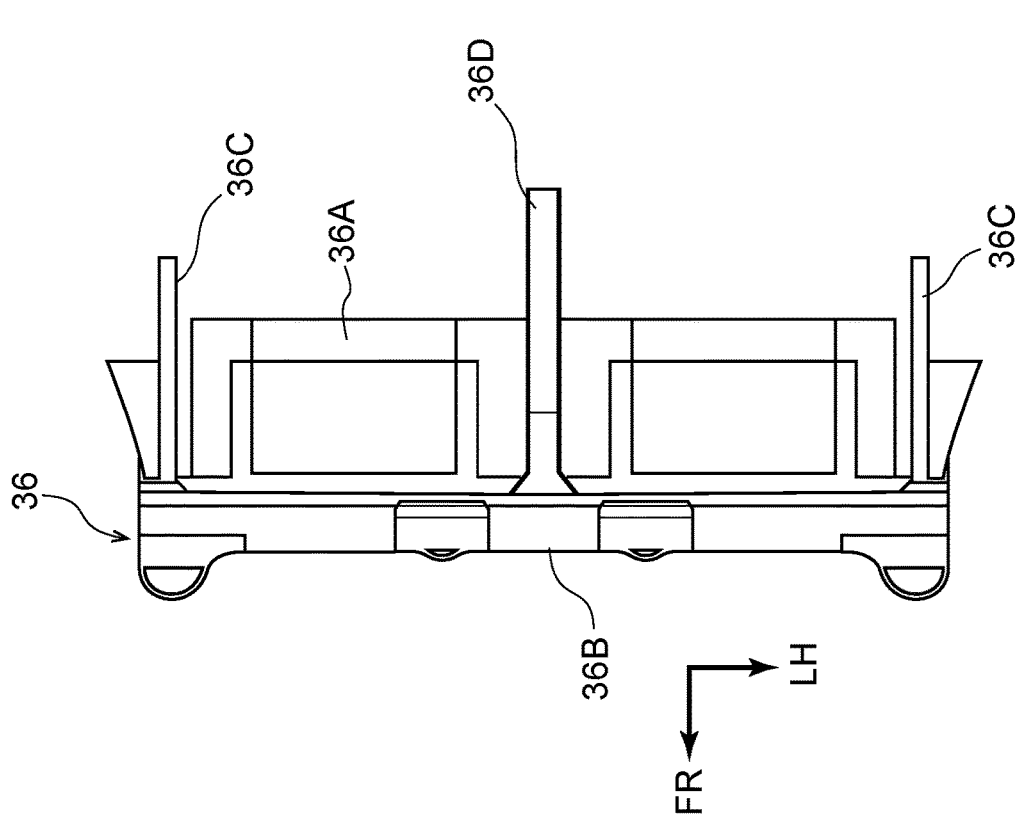
Figure 10:
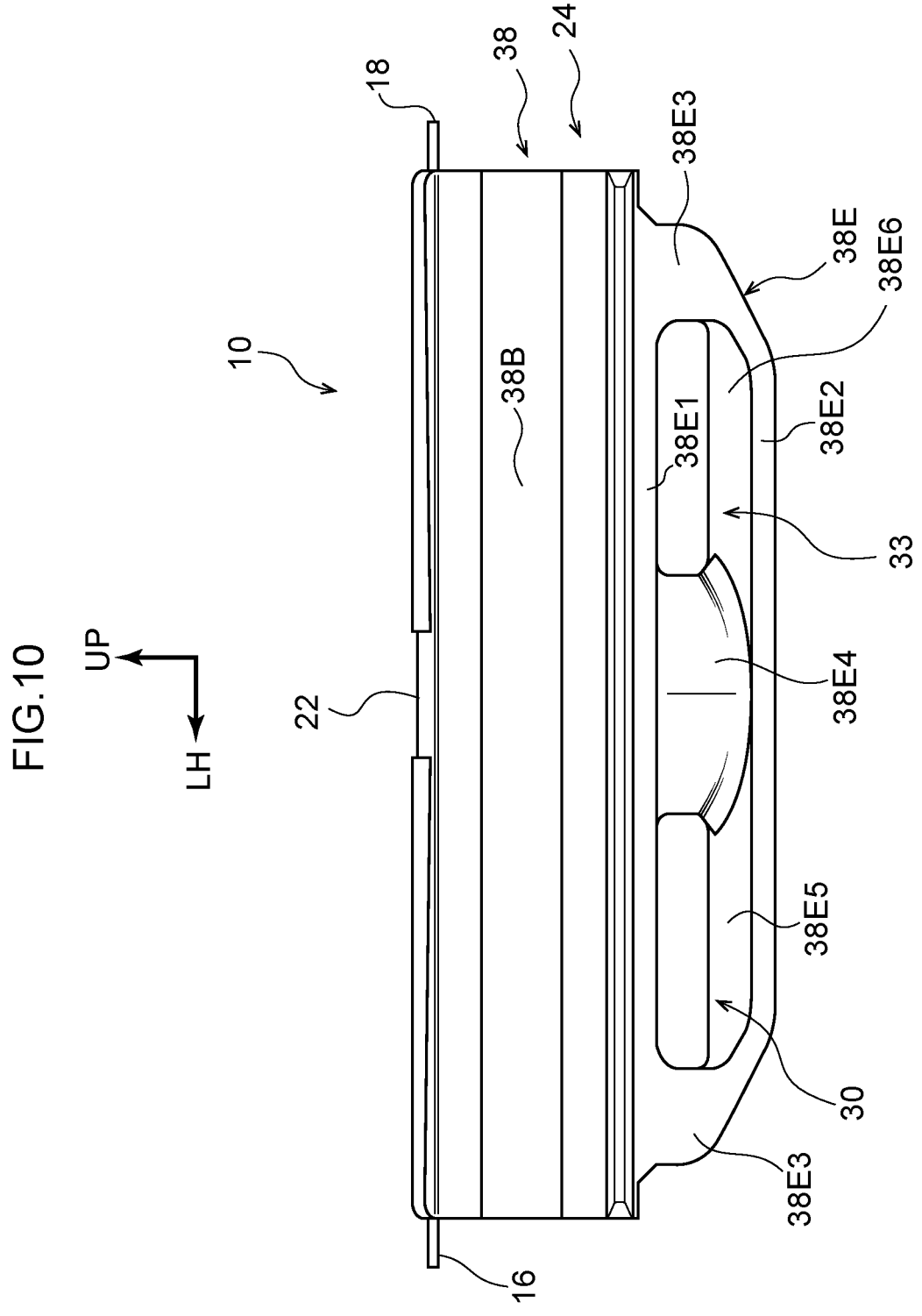
FIG. 10 is a rear view (viewed along the direction of arrow 10 in FIG. 1) illustrating a configuration of a battery pack case according to the present exemplary embodiment.

As illustrated in FIG. 9 and FIG. 10, in the present exemplary embodiment, the flow path forming part 24 includes an end structural part 36 configuring end parts of the cooling air flow path part 30 and the cooling air flow path part 33, and an air vent part 38 that can be connected to the blower 40. The end structural part 36 is provided integrally with a portion at the one side, in the first direction, of the main body part 26 and the main body part 32, as well as with the one side, in the first direction, of the end part 28 and the end part 34.

The air vent part 38 is provided integrally with a portion at the other side, in the first direction, of the main body part 26 and the main body part 32, as well as with the end part 28 and the end part 34 at the other side in the first direction.

Accordingly, in the present exemplary embodiment, portions of the cooling air flow path part 30 and the cooling air flow path part 33 that are likely to be complex in configuration can be configured by the flow path forming part 24 made of resin, as a result of which the shapes of the main body part 26, the main body part 32, the end part 28, and the end part 34 can be simplified to shapes that can be molded by pressing or the like.

This enables the manufacturing efficiency of the battery pack case 10 to be improved in the present exemplary embodiment.

Returning to FIG. 4, in the present exemplary embodiment, the battery cell housing part 16 and the battery cell housing part 18 are disposed in a consecutive manner in the third direction, whereby the capacity for housing the battery cells 14 can be increased. Moreover, in the battery cell housing part 16 and the battery cell housing part 18 arranged consecutively in the third direction, the main wall part 28A and the main wall part 34A at the one side in the first direction are connected together by a metallic connection member 20, and the main wall part 28A and the main wall part 34A at the other side in the first direction are connected together by a metallic connection member 22.

Therefore, in the present exemplary embodiment, the connection member 20 can reinforce the main wall part 28A and the main wall part 34A at the one side in the first direction, and the connection member 22 can reinforce the main wall part 28A and the main wall part 34A at the other side in the first direction. Accordingly, in the present exemplary embodiment, in addition to being able to contribute to ensuring the power capacity of the battery pack 12, the battery pack case 10 can be reinforced with respect to the restoring force of the battery cells 14.

In addition, in the present exemplary embodiment, a bead part 28C is provided at the main wall part 28A of the end part 28, a bead part 34C is provided at the main wall part 34A of the end part 34, a bead part 20D is provided at the connection member 20, and a bead portion 22D is provided at the connection member 22. The bead part 20D, the bead part 22D, the bead part 28C, and the bead part 34C extend in the third direction, and project toward the opposite side from the battery cell 14. Accordingly, in the present exemplary embodiment, in each of the main wall part 28A, the main wall part 34A, the connection member 20, and the connection member 22, rigidity relative to the restoring force of the battery cell 14 can be ensured. Accordingly, in the present exemplary embodiment, the rigidity of the battery pack case 10 with respect to the restoring force of the battery cells can be improved.

Supplementary Explanation to the Foregoing
Exemplary Embodiment (1) In the exemplary embodiment described above, although the battery pack case 10 includes plural battery cell housing parts, the number of individual battery cell housing parts can be increased or decreased in accordance with the specifications and the like of the vehicle in which the battery pack case 10 is to be installed. Here, the configurations of the connection member 20 and the connection member 22 may be modified as appropriate in accordance with the number of battery cell housing parts.

(2) In addition, in the exemplary embodiment described above, although a part of the cooling air flow path part is configured by the battery cell housing part, depending on the specifications and the like of the battery cells housed in the battery pack case 10, a configuration may be adopted in which the entirety of the cooling air flow path parts is configured of resin. For example, a configuration may be adopted in which the battery cell housing part is configured by a frame-shaped metal member when viewed from the second direction, and the entirety of the support part and the cooling air flow path part of the battery cell is provided in the flow path forming part made of resin.

What is claimed is:

1. A battery pack case, comprising:

a battery cell housing assembly, the battery cell housing assembly being made of metal, the battery cell housing assembly being configured to accommodate, from one side in a second direction, a battery cell in a state in which a plurality of the battery cells are stacked in a first direction perpendicularly intersecting the second direction and are compressed in the first direction, and the battery cell housing assembly being configured to support a restoring force of the battery cell; and a flow path forming member, the flow path forming member being made of resin, the flow path forming member being provided integrally with the battery cell housing assembly, the flow path forming member being disposed at another side, in the second direction, of the battery cell, and the flow path forming member configuring a part of a cooling air flow path through which battery cell cooling air flows;

wherein the battery cell housing assembly comprises:

a first component, including:

a pair of first side wall parts that extend in the first direction and that are configured to support the battery cell in a third direction perpendicularly intersecting the first direction and the second direction, and a support wall part that supports the battery cell from the other side in the second direction; and a pair of second components, including:

a second side wall part configured to support the battery cell in the first direction, and a pair of third side wall parts that are provided continuously with the second side wall part at one side and another side, in the third direction, of the second side wall part, and that are joined to the respective first side wall parts.

2. The battery pack case according to claim 1, wherein:

a main flow path part is provided integrally with the support wall part at the other side, in the second direction, of the support wall part, the main flow path part configuring a part of the cooling air flow path, extending in the first direction, and being configured to supply the cooling air to the battery cell; and the flow path forming member includes:

an end part structural part provided integrally with a portion of the first component at one side thereof in the first direction and with the one side, in the first direction, of the second component, and configuring an end of the cooling air flow path, and an air vent part provided integrally with a portion of the first component at another side thereof in the first direction and with the other side, in the first direction, of the second component, and configured to connect to a blower part configured to supply the cooling air to the cooling air flow path.

3. The battery pack case according to claim 1, wherein a plurality of the battery cell housing assemblies is disposed in a consecutive manner in the third direction, and the battery cell housing assembly further comprises:

a first connection member, the first connection member being made of metal, the first connection member connecting together the second side wall parts at the one end in the first direction; and a second connection member, the second connection member being made of metal, the second connection member connecting together the second side wall parts at the other end in the first direction.

4. The battery pack case according to claim 3, wherein a bead part, which extends in the third direction and projects toward an opposite side from the battery cell, is provided at each of the second side wall part, the first connection part, and the second connection part.

\* \* \* \* \*